Nov. 21, 1950 L. RADO 2,530,400
PROCESS FOR THE PRODUCTION OF CONTAINERS
FILLED WITH LIQUIDS OR PASTES
Filed Sept. 10, 1946 4 Sheets-Sheet 2
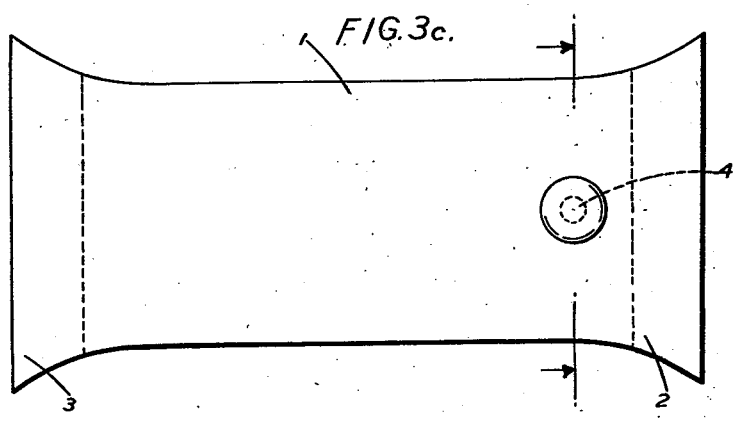
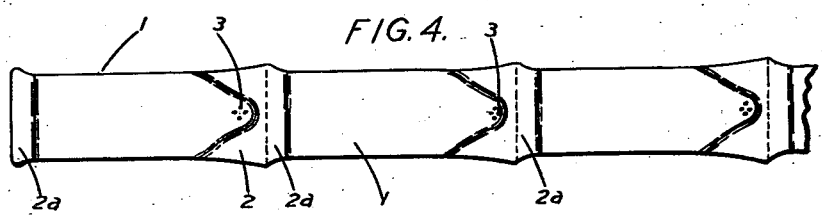
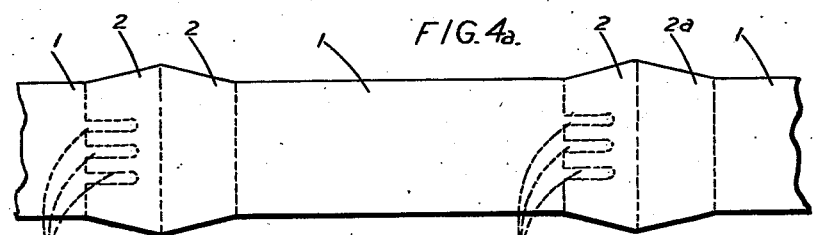
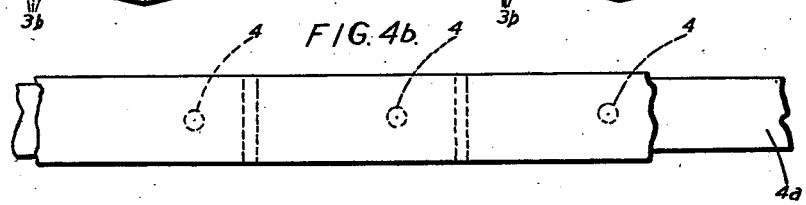
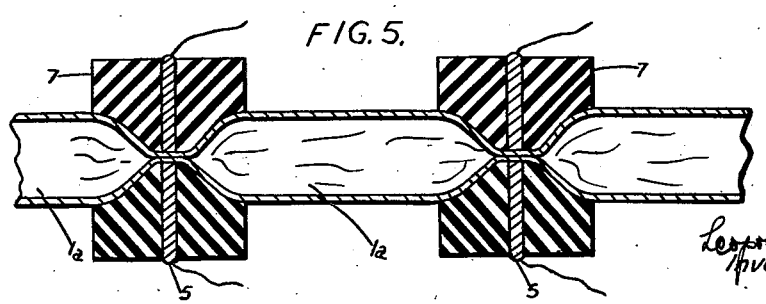

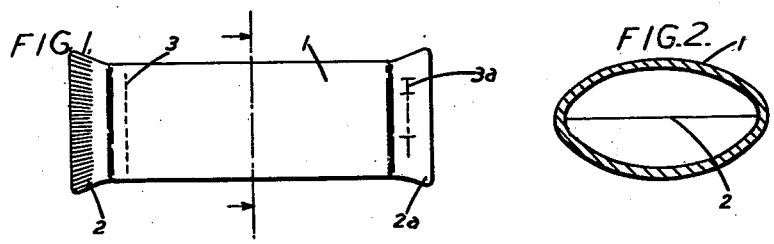
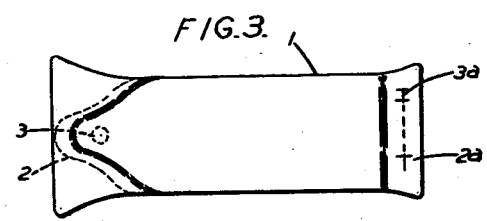
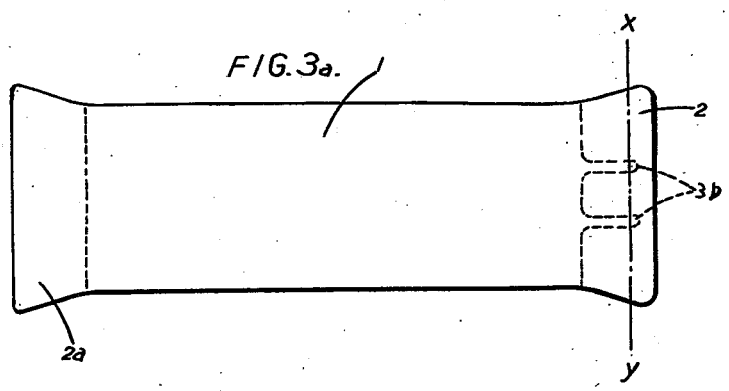
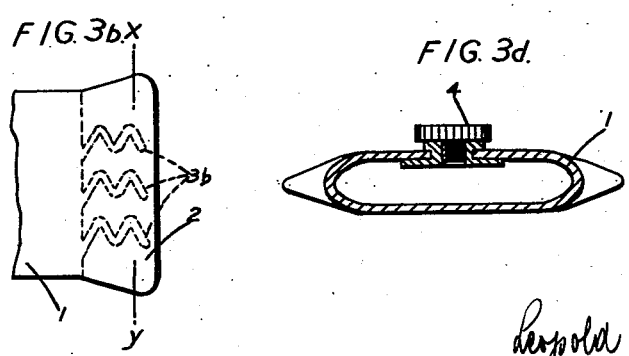

Leopold Rado
Inventor

Nov. 21, 1950 L. RADO 2,530,400
PROCESS FOR THE PRODUCTION OF CONTAINERS
FILLED WITH LIQUIDS OR PASTES
Filed Sept. 10, 1946 4 Sheets-Sheet 4

Leopold Rado
Inventor

UNITED STATES PATENT OFFICE 2,530,400

PROCESS FOR THE PRODUCTION OF CONTAINERS FILLED WITH LIQUIDS OR PASTES

Leopold Rado, Whitehaven, England

Application September 10, 1946, Serial No. 696,059
In Great Britain September 19, 1945

7 Claims. (Cl. 93—3)

The present invention relates to a process for producing liquid or paste-filled containers, said containers being made from a pliable non-metallic material of a thermo-plastic nature, for example vinyl resin and particularly polyvinyl chloride with a high content of plasticiser.

In accordance with the present invention the production of such containers can be carried out in the most economical way, as follows:

A considerable length of tubing of pliable elastic polyvinyl chloride sufficient to produce a number of containers, is sealed by pressure and heat at one end, and filled through the other end, whereafter pressure is applied laterally on the filled tubing walls at the distance required to produce a single container measured from the already sealed end of the tubing to cause the contents to be displaced at the place where the pressure is applied so that the walls of the tubing make contact with each other thereat. The tool with which the pressure is applied to the tubing walls, generates heat and the contacting inner surfaces thereof become welded together, whereby a tube-like package sealed at both ends is produced. A filled container so produced is separated from the remaining part of the tubing by cutting along the middle of the width of the welded place, so that the severed end of the length of tubing is also sealed. This operation is repeated to produce further filled containers.

An even more economical method is to produce a plurality of containers simultaneously in the manner described in the immediately preceding paragraph, the pressure being applied simultaneously at a number of places spaced the required distance apart from one another. The containers are then separated from one another by cutting as previously described.

In a somewhat modified method of simultaneously producing a plurality of filled containers a substantial length of tubing is first sealed at one end by heat and pressure, then filled through the other end which is thereafter sealed. The operations previously described are then carried out.

The filling of a considerable length of tubing with liquid is simple, but if the tubing is to be filled with paste difficulties are encounted as the tubing, one end of which is already sealed, is filled with air which hinders the further filling thereof. To overcome this, it is proposed that the length of tubing provided for making a number of containers shall be sealed by pressure and heat at one end, and filled through the other end by the insertion therein, and throughout the entire length thereof, of an already filled stiff tube, for example of metal, and from said feeding tube the contents are expelled into the tubing which thereon fills upwardly as the stiff tube is gradually withdrawn from the tubing provided for the packages. It is also possible to fill a considerable length of tubing with paste when both ends are left unsealed. The tubing is filled through one end, and the air is expelled through the opposite end as the paste moves in. After filling, the containers are produced in accordance with the present invention.

To carry out the welding, a pair of tools, or pairs of tools is or are used for pressing aside the contents of the filled tubing in order to divide it into compartments, and to bring the tubing walls into contact with each other at the welding places. On welding, the tube walls become plastic at the welding places, and in consequence the tensional strength is weakened; if therefore the pressing tool has a sharp edge there is danger of damage to the tube walls. It is accordingly proposed that such edges of the welding tools as engage the tube walls, laterally shall be rounded. The pressing tools which distribute the contents of the tubing, generate heat and are used also for welding. The heat acts on the elastic tubing wall which becomes plastic and welding occurrs.

In view of the poor thermal conductivity of the tube body, the external application of heat, in particular when the tubing wall is over 1 mm. in thickness, will be disadvantageous, as the heat must act through the thickness of the walls from the outer surfaces thereof to the inner joining surfaces, and the softening of the outer surfaces of the walls will be of greater degree than that of the inner surface thereof, so that a certain time is needed for the heat to travel through the walls to soften the inner surface to such degree that welding can occur, whereby the outer surface becomes distorted. This disadvantage is increased by the fact that the tube is filled and is exposed to an inner pressure. If tubing of lesser wall thickness than 1 mm. is used and there is no inner pressure therein direct external heating can be used, but there will be the danger that the tube material will become damaged at the welding place by the heated tool, and also that the softened tube material will adhere to the tool. It is proposed, in the case of direct external heat application, to cover the welding place before such heat application takes place with, for example, a thinly rolled sheet of aluminium foil which lies between the heated tool and the tube body, whereon welding is carried out, and the welded place left to cool between the metal foils. After such cooling, the foil is removed.

It will be most advantageous, if welding is carried out by high frequency electricity, to employ electrodes as jigs, in which case the joining surfaces of the tubing walls are heated and so welded without endangering the tube body, and in particular the welded place will suffer no distortion. The electrodes serving as pressing tools will distribute the contents of the tubing and thereafter carry out the welding. The electrodes are shaped as required.

If the tubing is filled with such liquids or pastes which suffer chemical changes through heat action, it is essential to keep such substance away from the immediate neighbourhood where welding takes place, and it is proposed therefore that the heat generator is surrounded with a heat insulating material and the task of this part of the pressing tool will be only to press and keep the contents of the tubing away during the welding operation from the neighbourhood where welding takes place. The pressing tool in this instance is the welding tool and while performing the operation of pressing the tube to distribute the contents thereof to bring the tube walls into contact with one another for welding, the same must be at a temperature less than the melting point of the tubing in order to prevent the tube rupturing when the contents are placed under pressure. After the initial pressing operation and the contents have been distributed and the walls of the container brought into contact, heat is then applied to the tool to effect a fusion or seal at the point of contact of the tube walls. In case of the welding tools being electrodes such surrounding of the electrodes must be made of non-electro-conductive material.

Experience has shown, contrary to all expectation, that a length of filled tubing, particularly when the filling is highly inflammable, for example petrol, nitro-cellulose solution, or the like, can by pressing the contents aside from the welding place, be welded without danger, by high frequency electricity, and tubing containing substances such as oils, or greasy pastes, can be welded with success.

The welding tools, in the case of producing a cushion like container, are straight lined, but if a tube-like container having a shoulder and neck is to be produced, the pressing tools must be shaped accordingly.

As stated, the welded portions of tubing are separated by cutting, which is done approximately in the centre of the welded space, and can be carried out any time after welding by a sharp tool, or scissors. Such separation must be carefully done, as the welded portion is part of two containers. It is proposed to separate the latter by a cutting tool, after welding has taken place, but while the welded place is still under pressure from the welding tool. This can be done if the welding tool is slit, and a thin sharp blade is inserted therein, whereby separation by cutting is carried out. If the welding tools are electrodes, the slit is made in one of the electrodes and the cutting blade can be inserted therein. (The cutting blade is preferably inserted in the earth electrode.) The cutting blade is movable, and during welding, lies outside the electrodes, as otherwise the blade being electro-conductive, would become hot and also contact the other electrode, thus endangering the oscillator. It is, however, possible in the case of high frequency welding, to produce the cutting tools from non-conductive material, such as glass, porcelain, and the like. In this case the cutting blade can be permanently built in the electrodes. As the electrodes are in repeated use in high frquency welding and become hot, it is advantageous, to cool them, for example by water cooling, in which case they must be hollow bodies through which the cooling liquid can flow. The electrodes can be provided with engravings, which will be impressed on the container at the same time as welding takes place.

A considerable number of containers can be produced if several lengths of filled tubing are arranged parallel to each other, and simultaneously subjected to the action of the pressing and welding tools. The single containers thus produced, if of pliable thermo-plastic material, are collapsible and portions of the contents can be expelled therefrom as required for use, the contents being sealed therein in an airtight manner.

In accordance with the present invention a pliable elastic tube, for example of polyvinyl chloride with a high content of plasticiser or the like is filled with liquid or paste which is airtightly sealed therein by welding both ends of the tube, and from such tube-like container the contents are expelled through a punctured aperture produced by a pointed tool, for example a needle or the like, or through a slit cut by a sharp blade, the opening so made automatically closing after each expulsion in consequence of the elastic nature of the tube body.

The container can also be produced from a tube which is divided into two parts by a wall running the length thereof, said parts being filled with different substances which in accordance with the viscosity thereof, are expelled through pricks or slits provided in each compartment.

The container can be provided also with an opening and closing device for refilling purposes. Such a refilling device can be for example, an eyelet with a screw closure secured thereto.

A container in accordance with the present invention is generally to be provided with an inscription to mark the contents thereof, and also to mark the place from which the contents can be expelled. This latter is important, as if, for example, pricks are made on the wall, they become invisible in consequence of the self-sealing nature of the elastic material, and the user must know where expulsion will take place. The marking of such expulsion places can be done, for example, by a transfer process whereby a print is made on a fibrous-free carrier by a thermo-plastic ink. A mandrel is inserted in the tubing, and the print carrier is laid over the tube wall, whereon heat and pressure are applied through the print carrier to the elastic tubing which thereby becomes plastic, and, after cooling, regains its elasticity, when the print carrier is removed, leaving the print behind on the tubing.

The tubing can also be printed by direct printing, for example by a rubber stamp, but in this case after the print is made the printed container must be exposed for a short time to heat, for example in an oven.

A further development and a most important feature, is a collapsible tube-like container which at one end is narrowed to a required shape, for example a neck-like formation. If such a container is filled with paste and the neck is provided with a prick or a slit extending in the direction of the width of the neck preferably in 90° at a distance from the end thereof, but not exceeding half of the circumference of the neck, and pressure is applied to the tube wall, contrary to expectation the contents will not leave the container, but with increase of pressure the neck stiffens and seals the aperture more securely. The contents of such a container can only be expelled by bending the neck where the aperture is made in a direction opposite thereto, and at the same time applying pressure on the tube wall. Both actions must be carried out at the same time. An aperture can also be provided on each side of the neck, in which case on bending the neck and applying pressure on the tube wall, the contents are expelled only from that aperture from which the neck is bent in a direction opposite thereto.

When the container and neck thereof are divided by a wall the contents are separated thereby, and an aperture on one side of the neck is used to expel the contents from one compartment to the container, and an aperture on the opposite side of the neck is used to expel the contents from the other compartment.

The size of aperture is adjusted to the viscosity of the contents; for liquids for example, the aperture can be made by a pin; for thick pastes a slit is necessary.

Although the apertures open for expulsion on pressure, or on bending or pressure, and not by touch only, during transport of the article it is desirable to cover them with a sheet material provided with a permanent adhesive and stuck thereover, or to provide a shield made from a rigid material for protection.

The sealed ends of the containers made in accordance with the present invention, are flap-like, and can, if of certain width, be used for smoothing the extruded contents over a surface. The apertures will in this case be arranged adjacent to that flap. It is also possible to provide the flap with cuts to form a fringe for use as a brush for the extruded contents. Further it is possible to use one of the flaps for holding the pricking tool, for example a pin.

The tubing provided for making the containers in accordance with the present invention, is most suitable if produced by extrusion, but they can be produced also from tubing made from a strip or strips cut from a sheet material, the longitudinal seams of which are welded under heat action.

The tubing of polyvinyl chloride can be produced from pliable sheets rolled on a mandrel in many layers, and between said layers other sheet materials can be incorporated for example, sheets of cellulose or unvulcanised rubber, but in particular sheets of a thermo-plastic nature.

Materials of a non-thermo-plastic nature can also be incorporated, for example, paper, metal foil, or the like. If fibrous-free-non-thermoplastic materials are incorporated, the welding places must be left free from such materials. If required and considered necessary or useful, the tubing can be lacquer coated internally or externally or if the tubing is built of layers, such coating can be incorporated between the layers.

The accompanying drawings illustrate the invention.

In Fig. 1 is shown a container 1 in cushion form sealed by welding at the ends 2 and 2a. Near one welded end the wall thereof is provided with spot-like prints 3, to mark the places where puncturing is made. The sealed flap-like end marked 2 is fringed, and can be used to smooth or spread the expelled contents on a desired surface. The flap-like end 2a can be used as a holder for a pin-like tool 3a provided for any further puncturing required.

Fig. 2 shows the tube shown in Fig. 1 in sectional view.

Fig. 3 shows the tube of Fig. 1 with the difference that the end 2 of the tube is of neck-like formation, and the welded parts can be cut through on the dotted lines. The flap-like sealed end is marked 2a, and serves as a holder for a pin 3a. The spot where puncturing is to be made for the expulsion of the contents therethrough is marked 3.

Fig. 3a shows the tube of Fig. 1 with the difference that the end 2 of the tube has two unwelded necks marked 3b, said necks being slit with a sharp blade on the line x—y. The expulsion of the contents is effected by bending the flap 2 in the direction opposite to the slits, and at the same time applying pressure on the tube wall.

Fig. 3b shows a sealed tube end as shown in the tube of Fig. 3a with the difference that three necks are provided, marked 3b, said necks being of zig-zag formation. The necks are slit on the line x—y, and the expulsion of the tube contents is made as in the tube of Fig. 3a.

Fig. 3c shows a tube similar to that shown in Fig. 1 provided with an eyelet and closure thereto 4 for refilling the tube.

Fig. 3d is a sectional view of the tube with an eyelet as shown in Fig. 3c.

Figure 5A:
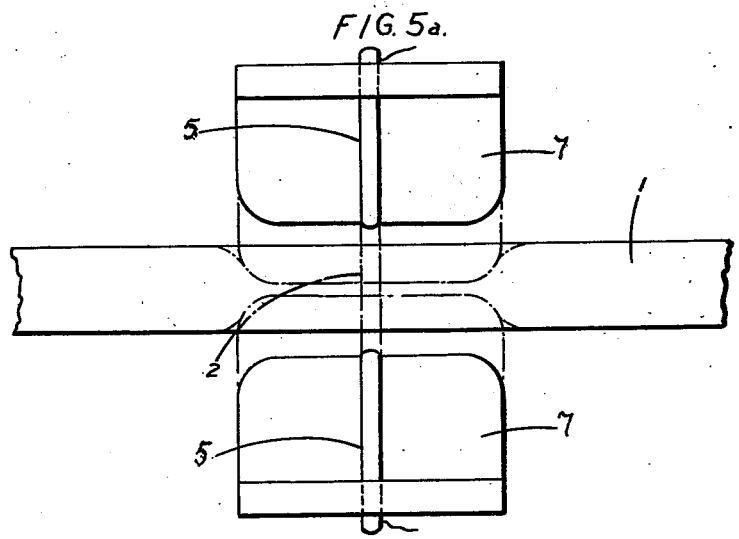

Fig. 4 shows a row of tube-like containers, each like the single tube of Fig. 3, produced by filling a tube of considerable length with a filling substance, and at the places 2 and 2a applying pressure to cause the tube walls to contact each other, so that by heat application they become welded. The pressing and welding tool is so shaped as to produce the neck-like formation at one unit end, and the straight welding of the unit following, at one and the same time.

Fig. 4a shows a row of tube-like containers each like the single tube of Fig. 3a, produced by filling a tubing of considerable length with a filling substance and at the places 2 and 2a applying pressure to cause the tube walls to contact each other so that by heat application they become welded. The pressing and welding tool is so shaped as to produce the three neck-like formations at one unit end and the straight welding of the unit following. After welding the tube-like containers are separated.

Fig. 4b shows a method how a tubing of considerable length provided for a number of tube-like containers is provided with eyelets shown in Figs. 3c and 3d. In the tubing is inserted a mandrel 4a and the eyelets marked 4 are fixed in the provided holes prior to the filling of the tubing and separation into compartments.

Fig. 5 shows diagrammatically in sectional view, the welding of the tube ends. The tube of considerable length is filled with a substance 1a, and brought between the rounded edged pressing tools 7, and when pressure is applied the contents of the tube are divided, the walls contact each other, and the heat generators 5, in this case high frequency generators (electrodes), carry out the welding. The part 7 of the pressing tool is non-electro-conductive and has the task of keeping the contents of the tubing away during the welding operation from the immediate neighborhood of that place where the heat generators marked 5, act.

Fig. 5a illustrates how the contents of the tubing are divided by pressure from the pair of welding tools shown in Fig. 5.

Figure 5B:
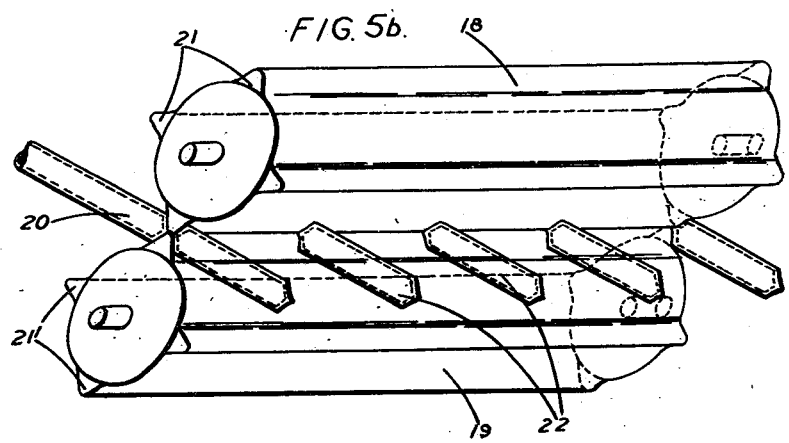

Fig. 5b shows diagrammatically an apparatus for producing a number of tube-like containers continuously in rotation. Several lengths of filled tubing 20 are laid parallel to each other, and are brought between rotating pressing rollers having flanges 21 which during rotation, meet across the tubing and press thereon, pushing aside the contents and welding the tube into separate compartments. The containers separated therefrom are marked 22.

Figure 6:
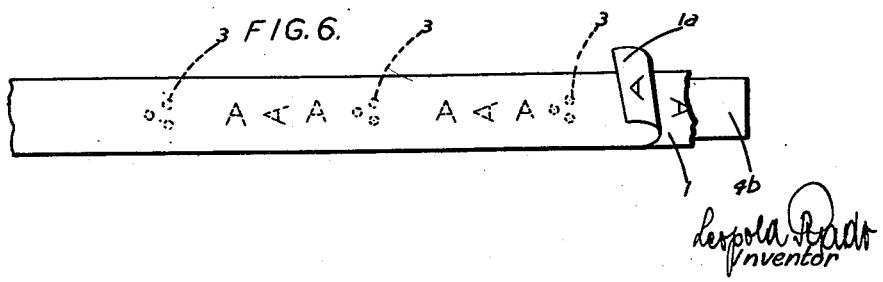

Fig. 6 shows how the tubing is provided with prints by way of transfer to mark the places where puncturing or slitting is made. A mandrel 4b is inserted in the tubing 1, a print 3 is made on a fibrous-free sheet material 1b. The print carrier is laid with its printed side over the tubing, and heat is applied thereon to effect the transfer.

Figure 7:
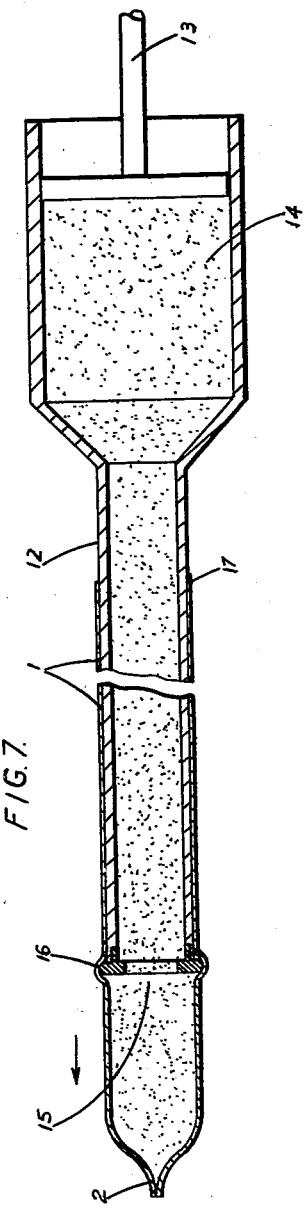

Fig. 7 shows a method of filling an elastic tube sealed at one end and filled with paste or semi-liquid substance. In the elastic tube 1, welded at the end 2 is inserted a metal tube 12 filled with a paste 17 fed from the container 14 by pressing the part 13. The contents of the metal tube on the application of pressure, will fill the elastic tube which will slide away in the direction of the arrow from the metal tube without leaving air holes in the substance. When the elastic tube is entirely filled the open end is welded and by the method shown in Fig. 5 the tube-like containers are produced. To use the filling equipment for tubes of different diameters, the head part of the filling tube is exchangeable, and is of such diameter that the elastic tube is slightly stretched thereon.

Having described my invention, what I claim as new and desire to secure by Letters Patent is:

1. A process for the production of plastic containers for fluid substances wherein a plurality of individual containers are provided each containing a desired amount of fluid substance therein consisting of: firstly, sealing one end and filling a length of thermoplastic tubing with a fluid substance through the open end the length being at least greater than the length of a single container to be formed and the amount of fluid substance being at least in excess of that amount required for one container; secondly, pressing the tube walls together at a point where sealing is to be effected such pressure extending beyond the immediate area to which heat is to be applied for sealing the side walls of the tube at distances apart equal to the length of at least one container while the pressing medium is at a temperature less than the melting point of the tubing thereby displacing the contents of the tube from the area where welding will take place; and thirdly, thereafter applying heat to the pressing medium effecting a welding of the contacting walls of the tubing whereby a tube-like container sealed at both ends is produced.

2. A process for the production of plastic containers for fluid substances as claimed in claim 1 wherein the process is continued until the supply of thermoplastic tubing is expended.

3. A process for the production of plastic containers for fluid substances as claimed in claim 1 wherein pressure and thereafter heat are applied to the tubing at a plurality of places spaced apart from one another at distances equal to the length of a container in such manner that tube-like containers sealed at both ends are produced.

4. A process for the production of plastic containers for fluid substances as claimed in claim 1 wherein the pressing medium is a welding tool, the edges of which come into contact with the tubing and which lie laterally on the tube are rounded.

5. A process for the production of plastic containers for fluid substances as claimed in claim 1 wherein the sealing is effected by a pair of tools which are high frequency electrodes and which after pressing has taken place generate heat which welds the contacting walls of the thermoplastic tubing together.

6. A process for the production of plastic containers for fluid substances as claimed in claim 1 wherein the pressing medium is provided with means for removing the end walls of the containers being formed from the immediate neighborhood of the application of heat whereby the substances within the tubing is not permitted to exert its pressure at the softened point of welding.

7. A process for the production of plastic containers for fluid substances as claimed in claim 6 wherein the means for keeping the contents of the tubing away from the immediate neighborhood of the welding tool during welding are of non-electro conductive material.

LEOPOLD RADO.

REFERENCES CITED

The following references are of record in the file of this patent:

UNITED STATES PATENTS

| Number | Name | Date |
|---|---|---|
| 700,805 | Paine | May 27, 1902 |
| 1,237,630 | Freund | Aug. 21, 1917 |
| 1,592,584 | Veegelmonn | July 13, 1926 |
| 1,921,944 | Riebel, Jr. | Aug. 8, 1933 |
| 1,970,193 | Riebel, Jr. | Aug. 14, 1934 |
| 2,113,658 | Lakso | Apr. 12, 1938 |
| 2,142,505 | Gammeter | Jan. 3, 1939 |
| 2,166,643 | Salfisberg | July 18, 1939 |
| 2,430,995 | Roos | Nov. 18, 1947 |